United States Patent
Yamanaka et al.

(10) Patent No.: US 12,098,273 B2
(45) Date of Patent: Sep. 24, 2024

(54) POLYBUTYLENE TEREPHTHALATE RESIN COMPOSITION

(71) Applicant: MITSUBISHI CHEMICAL CORPORATION, Tokyo (JP)

(72) Inventors: Yasushi Yamanaka, Hiratsuka (JP); Hidekazu Shoji, Hiratsuka (JP); Rina Takeuchi, Hiratsuka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 238 days.

(21) Appl. No.: 17/262,320

(22) PCT Filed: Jul. 19, 2019

(86) PCT No.: PCT/JP2019/028438
§ 371 (c)(1),
(2) Date: Jan. 22, 2021

(87) PCT Pub. No.: WO2020/022208
PCT Pub. Date: Jan. 30, 2020

(65) Prior Publication Data
US 2021/0292547 A1    Sep. 23, 2021

(30) Foreign Application Priority Data

Jul. 23, 2018 (JP) ................. 2018-137726
Jun. 24, 2019 (JP) ................. 2019-116620
Jun. 24, 2019 (JP) ................. 2019-116621

(51) Int. Cl.
*C08L 67/02* (2006.01)
*B32B 5/08* (2006.01)
(Continued)

(52) U.S. Cl.
CPC .............. *C08L 67/02* (2013.01); *B32B 5/08* (2013.01); *B32B 15/085* (2013.01);
(Continued)

(58) Field of Classification Search
CPC .............. C08L 67/02; C08L 2205/025; C08L 2205/035; C08L 33/04; C08L 63/04; C08L 69/00; C08L 83/04; C08K 7/14
See application file for complete search history.

(56) References Cited

U.S. PATENT DOCUMENTS 6,447,913 B1    9/2002   Watanabe et al.
6,582,824 B1 *  6/2003   Weigl ................... C09K 3/1021
                                                    525/903
(Continued)

FOREIGN PATENT DOCUMENTS

JP    8-70999 A    3/1996
JP    9-3322       1/1997
(Continued)

OTHER PUBLICATIONS

Zhang et al., Reactive Compatibilization of Poly(butylene terephthalate)/Low-Density Polyethylene and Poly(butylene terephthalate)/Ethylene Propylene Diene Rubber Blends with a Bismaleimide, 1999, J. Appl Polym Sci., vol. 71, 2049-2057 (Year: 1999).*

(Continued)

*Primary Examiner* — David J Buttner
*Assistant Examiner* — Surbhi M Du
(74) *Attorney, Agent, or Firm* — Oblon, McClelland, Maier & Neustadt, L.L.P.

(57) ABSTRACT

A polybutylene terephthalate resin composition, comprising comprising a thermoplastic resin (A) containing a polybutylene terephthalate resin and, per 100 parts by mass of the thermoplastic resin (A), from 0 to 30 parts by mass of an elastomer (B), from 0.3 to 4 parts by mass of an epoxy compound (C), from 15 to 80 parts by mass of a reinforcing filler (D), and from 1 to 15 parts by mass of a masterbatch
(Continued)

(E) containing a silicone compound with a weight-average molecular weight of 10,000 to 80,000 and a thermoplastic resin.

8 Claims, 2 Drawing Sheets

(51) Int. Cl.
| | |
|---|---|
| B32B 15/085 | (2006.01) |
| B32B 15/088 | (2006.01) |
| B32B 15/092 | (2006.01) |
| B32B 27/28 | (2006.01) |
| B32B 27/32 | (2006.01) |
| B32B 27/34 | (2006.01) |
| B32B 27/38 | (2006.01) |
| C08G 77/04 | (2006.01) |
| C08J 5/04 | (2006.01) |
| C08L 83/04 | (2006.01) |
| B29C 65/16 | (2006.01) |
| C08J 3/22 | (2006.01) |

(52) U.S. Cl.
CPC .......... *B32B 15/088* (2013.01); *B32B 15/092* (2013.01); *B32B 27/285* (2013.01); *B32B 27/32* (2013.01); *B32B 27/34* (2013.01); *B32B 27/38* (2013.01); *C08J 5/043* (2013.01); *C08L 83/04* (2013.01); *B29C 65/16* (2013.01); *B32B 2264/108* (2013.01); *B32B 2274/00* (2013.01); *C08G 77/04* (2013.01); *C08J 3/226* (2013.01); *C08L 2205/025* (2013.01); *C08L 2205/035* (2013.01)

(56) References Cited

U.S. PATENT DOCUMENTS

| | | |
|---|---|---|
| 2002/0188073 A1 | 12/2002 | Uno et al. |
| 2015/0233026 A1 | 8/2015 | Abdulbaki et al. |
| 2019/0055398 A1 | 2/2019 | Tojo et al. |
| 2019/0249003 A1 | 8/2019 | Osano et al. |
| 2020/0172726 A1 | 6/2020 | Tojo et al. |
| 2021/0301125 A1 | 9/2021 | Yamakawa et al. |

FOREIGN PATENT DOCUMENTS

| | | | |
|---|---|---|---|
| JP | 10-45920 | A | 2/1998 |
| JP | 2001-261945 | A | 9/2001 |
| JP | 2006-152122 | A | 6/2006 |
| JP | 2009-19134 | A | 1/2009 |
| JP | 2009-149768 | | 7/2009 |
| JP | 2010-031283 | | 2/2010 |
| JP | 2011-016989 | | 1/2011 |
| JP | 2013-155279 | A | 8/2013 |
| JP | 2013-173871 | A | 9/2013 |
| JP | 2013-241534 | | 12/2013 |
| JP | 2014-196484 | A | 10/2014 |
| JP | 2015-108108 | A | 6/2015 |
| JP | 2015-108134 | A | 6/2015 |
| JP | 2015-108137 | A | 6/2015 |
| JP | 2015-129073 | A | 7/2015 |
| JP | 2016-500730 | A | 1/2016 |
| JP | 2016-56314 | A | 4/2016 |
| JP | 2016-181413 | | 10/2016 |
| JP | 2017-222747 | A | 12/2017 |
| JP | 2018-62554 | A | 4/2018 |
| JP | 2018062554 | A * | 4/2018 |
| WO | WO 00/78867 | A1 | 12/2000 |
| WO | WO 2018/047662 | A1 | 3/2018 |

OTHER PUBLICATIONS

Yamashita et al., JP2018062554—Polybutylene Terephthalate Resin Composition (Year 2018).*
Nakano et al., JP2009019134A-POLYESTER Resin Composition for Laser Welding and Molded Product Using the Same (Year 2009).*
Saheb et al., Compatibilization of PBT/polyolefin blends: Mechanical and dynamic mechanical properties, Advances in Polymer Technology 2000, 19(1), 41-53, Abstract. (Year: 2000).*
International Search Report issued on Sep. 3, 2019 in PCT/JP2019/028438 filed on Jul. 19, 2019, 2 pages.
Japanese Office Action issued Oct. 11, 2022 in Japanese Patent Application No. 2019-116620 (with unedited computer generated English Translation), 10 pages.
Japanese Office Action issued Jan. 24, 2023 in Japanese Patent Application No. 2019-133465 (with English Translation), 8 pages.
Office Action issued May 26, 2023, in corresponding Japanese Patent Application No. 2019-133465, (with English-language Translation).

* cited by examiner

POLYBUTYLENE TEREPHTHALATE RESIN COMPOSITION

TECHNICAL FIELD

The present invention relates to a polybutylene terephthalate resin composition and more particularly relates to a polybutylene terephthalate resin composition that exhibits an excellent impact resistance, an excellent durability in alkaline environments (also referred to herebelow as the "alkali resistance"), an excellent heat shock resistance, an excellent laser weldability, and an excellent two-color moldability, and further relates to a method for producing this polybutylene terephthalate resin composition and to a metal-resin composite article, a laser-weldable molded article, a laser-welded article, and a two-color molded article.

BACKGROUND ART

Polybutylene terephthalate resins are excellent in terms of ease of processability, mechanical properties, heat resistance, and others, i.e., physical properties and chemical characteristics, and as a result are widely used in such fields as automotive parts, parts for electrical and electronic devices, building material parts, parts for precision devices, and so forth. For example, polybutylene terephthalate resins are used in a broad range of fields, e.g., in the automotive field, and these resins are used for engine-adjacent parts such as connectors, distributor parts, ignition coil parts, and so forth, and for various control units, and various sensors; and used for parts of electrical and electronic devices such as connectors, switch parts, relay parts, and coil parts; and moreover used for building material parts such as sanitary parts and concrete embedded bolts.

In these fields and, particularly, for onboard automotive parts, wet heat resistance (hydrolysis resistance) has been required. To respond to this requirement, the hydrolysis resistance can be improved by the use of a polybutylene terephthalate resin having a low amount of carboxyl terminal group, and/or by capping carboxyl terminal groups by reacting the carboxyl terminal group with a prescribed compound.

However, polybutylene terephthalate resins exhibit an insufficient alkali resistance, particularly with regard to long-term durability thereof, and use-environment and use-applications of these resins are thus limited. For example, depending on the application of a resin molded article, use thereof may occur while being contact with a chemical, e.g., snow melting agents, toilet cleansers, bathroom cleansers, bleaches, and cement. In particular, an alkali-induced decline in strength is significant with glass fiber-reinforced articles, and deterioration in alkaline environments is considered a problem.

In addition, under the action of an alkaline substance, there is a risk that a part made from a polybutylene terephthalate resin, in particular, a thin-walled part or a part with residual strain, may undergo cracking and ultimately may rupture.

For example, in a case of a so-called metal insert article formed by composite between a metal and a resin, due to the shrinkage during cooling, residual strain may be produced in gate regions, and/or in particular strain may be readily produced at a metal/resin interface in corner regions and weld regions, whereby the generation of cracking is facilitated. Another problem, i.e., the generation of cracks in the corner region, weld region, or gate-vicinity region of a molded article, may be caused by so-called heat shock, in which a molded article, which undergoes thermal expansion at the high temperatures during molding, undergoes heat shrinkage in a low-temperature environment.

In addition, a space may be disposed in the interior of, for example, an onboard automotive part, in order to accommodate an electronic circuit, a moving part such as a motor or fan, a connector, and so forth. Each of the molded articles for these may be produced by division thereof into a plurality of resin members and molding and joining the same; this makes it possible to accomplish a shape optimization through hollowing and a weight reduction, which is superior to a case of molding as a single article.

The method for joining the resin members with each other can be exemplified by methods that use an adhesive and also methods such as mechanical joining, heated platen welding, vibration welding, ultrasound welding, thermal welding, and so forth. However, there has quite recently been a focus on laser-welded article production methods, which offer advantages of, inter alia, an excellent productivity and less influence on, for instance, resin members and electronic parts to be accommodated.

In laser welding, parts to be joined, i.e., a transmission side member that transmits laser light and an absorption side member that absorbs laser light are stacked on each other; exposure to laser light is carried out on the resulting joining surface by scanning laser light from the transmission side member; and the absorption side member is melted, whereby the two members are welded.

However, polybutylene terephthalate resins have a lower laser transmissivity than polycarbonate resins, polystyrenic resins and the like, hence, have a poorer laser weldability, and the weld strength then readily becomes insufficient.

In the two-color molding method, a resin having different characteristics from those of a polybutylene terephthalate resin is combined with the polybutylene terephthalate resin and these are molded into a single article to obtain a molded article having characteristics that cannot be realized by the polybutylene terephthalate resin by itself. However, in two-color molding, when the adhesive strength between the polybutylene terephthalate resin and the other resin is not adequate, the other resin may peel from the adhesive surface and satisfactory functions cannot be imparted to the molded article.

PTL 1 discloses that an excellent alkali resistance is exhibited by a thermoplastic polyester resin composition that contains (A) a thermoplastic polyester resin, (B) 1 to 25% by mass of an agent for imparting impact resistance, (C) 0.1 to 15% by mass of a silicone compound and/or a fluorine compound, (D) 1 to 50% by mass of an inorganic filler, and (E) 0.1 to 10% by mass of a multifunctional compound such as a bisphenol A epoxy resin, isocyanate compound, or carboxylic acid dianhydride. However, it cannot be said that this resin composition can provide a sufficiently satisfactory level of alkali resistance, heat shock resistance, laser weldability, or two-color moldability, and exacerbation in the surface appearance readily occurs in association with the outmigration of the silicone compound or fluorine compound.

There has been rapid progress in recent years in reducing the weight and raising the performance of products, hence, satisfactory properties have to be realized on a long-term basis even when these molded article products are made thinner and smaller. Due to this, today there is a demand for a polybutylene terephthalate resin composition that is excellent in terms of alkali resistance, heat shock resistance, and laser weldability, and that does not undergo cracking even in a thin-walled part or a region where residual strain is present.

CITATION LIST

Patent Literature

[PTL 1] WO 00/078867 A1

SUMMARY OF INVENTION

Technical Problem

In particular, very high levels have come to be required in recent years of the specifications for alkali resistance, heat shock resistance, laser weldability, and two-color moldability. Very severe standards—the details of which are described below—also have to be cleared, such as, for example: in alkali resistance testing at least 300 hours for the time until crack generation during immersion of an insert molded article in an aqueous NaOH solution having a concentration of 10% by mass; at least 200 cycles in heat shock resistance testing (number of cycles for crack generation at the weld line in −40° C.×30 min→130° C.×30 min heat cycling).

An object of the present invention is to solve the problem with the prior art as described above and provide a polybutylene terephthalate resin composition that is excellent in terms of impact resistance and at the same time exhibits improvement in the aforementioned high degree of alkali resistance and heat shock resistance as well as in the laser weldability and two-color moldability; a method for producing this polybutylene terephthalate resin composition; a metal-resin composite article; a laser-weldable molded article; a laser-welded article; and a two-color molded article.

Solution to Problem

As a result of extensive and intensive investigations in order to solve the aforementioned problem, the present inventors discovered that the alkali resistance and heat shock resistance are improved by the incorporation of (C) an epoxy compound, (D) a reinforcing filler, and a prescribed silicone compound. The present inventors in particular discovered that, through the incorporation of the silicone compound as a masterbatch with a thermoplastic resin, the dispersity of the silicone compound is improved and bleed out and appearance defects are suppressed, and moreover the strain increase during heat shock is suppressed and the heat shock resistance is substantially improved. The present invention was achieved based on these discoveries.

The present invention relates to, as described below, a polybutylene terephthalate resin composition and a method for producing same, a metal-resin composite article, a laser-weldable molded article, a laser-welded article, and a two-color molded article.

[1] A polybutylene terephthalate resin composition, comprising a thermoplastic resin (A) containing a polybutylene terephthalate resin and, per 100 parts by mass of the thermoplastic resin (A), from 0 to 30 parts by mass of an elastomer (B), from 0.3 to 4 parts by mass of an epoxy compound (C), from 15 to 80 parts by mass of a reinforcing filler (D), and from 1 to 15 parts by mass of a masterbatch (E) containing a silicone compound with a weight-average molecular weight of 10,000 to 80,000 and a thermoplastic resin.

[2] The polybutylene terephthalate resin composition of [1] above, wherein the epoxy compound (C) is a novolac epoxy compound.

[3] The polybutylene terephthalate resin composition of [1] or [2] above, wherein the thermoplastic resin in the masterbatch (E) is incompatible with the polybutylene terephthalate resin.

[4] The polybutylene terephthalate resin composition of any of [1] to [3] above, wherein the thermoplastic resin (A) further contains a polycarbonate resin.

[5] A method for producing a polybutylene terephthalate resin composition, the method comprising mixing a thermoplastic resin (A) containing a polybutylene terephthalate resin and, per 100 parts by mass of the thermoplastic resin (A), from 0 to 30 parts by mass of an elastomer (B), from 0.3 to 4 parts by mass of an epoxy compound (C), from 15 to 80 parts by mass of a reinforcing filler (D), and from 1 to 15 parts by mass of a masterbatch (E) containing a silicone compound with a weight-average molecular weight of 10,000 to 80,000 and a thermoplastic resin; and then melting and kneading the same.

[6] A metal-resin composite article wherein a thermoplastic resin (A) containing a polybutylene terephthalate resin and, per 100 parts by mass of the thermoplastic resin (A), from 0 to 30 parts by mass of an elastomer (B), from 0.3 to 4 parts by mass of an epoxy compound (C), from 15 to 80 parts by mass of a reinforcing filler (D), and from 1 to 15 parts by mass of a masterbatch (E) containing a silicone compound with a weight-average molecular weight of 10,000 to 80,000 and a thermoplastic resin, is joined to at least a portion of a metal member.

[7] A laser-weldable polybutylene terephthalate resin composition, comprising the resin composition of any of [1] to [3] above.

[8] A method for producing a laser-weldable polybutylene terephthalate resin composition, including the production method of [5] above.

[9] A laser-weldable molded article formed by molding the laser-weldable polybutylene terephthalate resin composition of [7] above.

[10] A laser-welded article provided by laser welding a transmission side member with an absorption side member, wherein at least one of the transmission side member and the absorption side member is the molded article of [9] above.

[11] A laser-welded article having the molded article of [9] above as an absorption side member.

[12] A two-color molded article containing a member (I) formed by molding the resin composition of any one of [1] to [4] above and a member (II) formed by molding a resin composition different from the resin composition forming the member (I).

Advantageous Effects of Invention

The polybutylene terephthalate resin composition according to the present invention has a substantially improved alkali resistance, heat shock resistance, laser weldability, and two-color moldability (adhesive strength), and also exhibits an excellent shock resistance.

Accordingly, the polybutylene terephthalate resin composition can be used in a broad range of fields, e.g., in the vehicle sector (particularly in the automotive sector), electrical and electronic sectors, construction material sector, and so forth. In particular, it has an excellent alkali resistance, heat shock resistance, laser weldability, two-color moldability, and impact resistance in service as a molded product for onboard parts such as connectors, distributor parts, ignition coil parts, various control unit parts, and sensor parts.

The method for producing a polybutylene terephthalate resin composition according to the present invention can provide a polybutylene terephthalate resin composition having a substantially improved alkali resistance, heat shock resistance, laser weldability, and two-color moldability and also having an excellent impact resistance.

The metal-resin composite article according to the present invention has a very high alkali resistance and heat shock resistance.

The laser-weldable molded article and the laser-welded article according to the present invention have a very high alkali resistance.

The two-color molded article according to the present invention has a very high alkali resistance and a high resin-to-resin adhesive strength.

DESCRIPTION OF EMBODIMENTS

Figure 1:
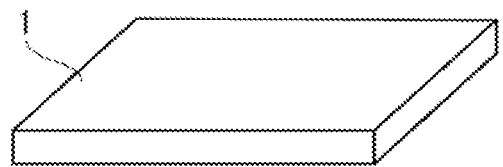
FIG. 1 is a schematic diagram of an iron insert in the shape of a rectangular parallelepiped, which is used for the evaluation of the heat shock resistance and alkali resistance in the examples.

The contents of the present invention are described in detail in the following. When "to" is used in a range in this Description, it is used in the sense of including the numerical values provided therebefore and thereafter as a lower limit and an upper limit.

The polybutylene terephthalate resin composition according to the present invention characteristically contains a polybutylene terephthalate resin (A), and per 100 parts by mass of the thermoplastic resin (A), from 0 to 30 parts by mass of an elastomer (B), from 0.3 to 4 parts by mass of an epoxy compound (C), from 15 to 80 parts by mass of a reinforcing filler (D), and from 1 to 15 parts by mass of a masterbatch (E) containing a silicone compound with a weight-average molecular weight of 10,000 to 80,000 and a thermoplastic resin.

[(A) Thermoplastic Resin That Contains a Polybutylene Terephthalate Resin]

The thermoplastic resin (A) that contains a polybutylene terephthalate resin, and that is used in the polybutylene terephthalate resin composition according to the present invention, contains at least a polybutylene terephthalate resin and may contain a thermoplastic resin other than polybutylene terephthalate resin. The thermoplastic resin other than polybutylene terephthalate resin can be exemplified by polyester resins such as polyethylene terephthalate, polytrimethylene terephthalate, polyethylene naphthalate, and polybutylene naphthalate, and by polycarbonate resins, polyamide resins, polyphenylene ether resins, styrenic resins, polyacetal resins, and so forth. Polycarbonate resins are preferred for the thermoplastic resin other than polybutylene terephthalate resin.

The content of the polybutylene terephthalate resin in the thermoplastic resin (A) is preferably 50 to 100 parts by mass and is more preferably greater than 50 parts by mass, still more preferably at least 55 parts by mass, and particularly preferably at least 60 parts by mass.

The polybutylene terephthalate resin is a polyester resin having a structure in which a terephthalic acid unit is ester bonded with a 1,4-butanediol unit, and includes, in addition to polybutylene terephthalate resin (homopolymer), polybutylene terephthalate copolymers containing a copolymerization component in addition to the terephthalic acid unit and 1,4-butanediol unit, and also includes mixtures of the homopolymer with such a copolymer.

The polybutylene terephthalate resin may contain a dicarboxylic acid unit other than terephthalic acid, and this other dicarboxylic acid can be specifically exemplified by aromatic dicarboxylic acids such as isophthalic acid, orthophthalic acid, 1,5-naphthalenedicarboxylic acid, 2,5-naphthalenedicarboxylic acid, 2,6-naphthalenedicarboxylic acid, biphenyl-2,2'-dicarboxylic acid, biphenyl-3,3'-dicarboxylic acid, biphenyl-4,4'-dicarboxylic acid, bis(4,4'-carboxyphenyl) methane, anthracenedicarboxylic acid, and 4,4'-diphenyl ether dicarboxylic acid; alicyclic dicarboxylic acids such as 1,4-cyclohexanedicarboxylic acid and 4,4'-dicyclohexyldicarboxylic acid; and aliphatic dicarboxylic acids such as adipic acid, sebacic acid, azelaic acid, and dimer acid.

The diol unit may contain a diol unit other than 1,4-butanediol, and this other diol unit can be specifically exemplified by aliphatic diols having 2 to 20 carbon atoms, alicyclic diols having 2 to 20 carbon atoms, and bisphenol derivatives. Specific examples are ethylene glycol, propylene glycol, 1,5-pentanediol, 1,6-hexanediol, neopentyl glycol, decamethylene glycol, cyclohexanedimethanol, 4,4'-dicyclohexylhydroxymethane, 4,4'-dicyclohexylhydroxypropane, and diols provided by the addition of ethylene oxide to bisphenol A. In addition to the difunctional monomers given above, a trifunctional monomer, e.g., trimellitic acid, trimesic acid, pyromellitic acid, pentaerythritol, trimethylolpropane, and so forth, may also be co-used in small amounts in order to introduce branched structures, and a monofunctional compound, e.g., a fatty acid and so forth, may also be co-used in small amounts for molecular weight adjustment.

As described above, the polybutylene terephthalate resin is preferably a polybutylene terephthalate homopolymer provided by the polycondensation of terephthalic acid with 1,4-butanediol, but may be a polybutylene terephthalate copolymer that contains one or more dicarboxylic acids other than terephthalic acid for the carboxylic acid unit, and/or that contains one or more diols other than 1,4-butanediol for the diol unit. When the polybutylene terephthalate resin is a copolymerization-modified polybutylene terephthalate resin, specific preferred copolymers in this case are polyester ether resins in which a polyalkylene glycol, and particularly polytetramethylene glycol, has been copolymerized, polybutylene terephthalate resin in which dimer acid has been copolymerized, and polybutylene terephthalate resin in which isophthalic acid has been copolymerized. Preferred is the use of polyester ether resin in which polytetramethylene glycol has been copolymerized.

These copolymers refer to copolymers in which the amount of copolymerization in the total segments of the polybutylene terephthalate resin is at least 1 mol % and less than 50 mol %. The amount of copolymerization is preferably at least 2 mol % and less than 50 mol %, more preferably 3 to 40 mol %, and particularly preferably 5 to 20 mol %. Such copolymerization proportions tend to facilitate improvements in the fluidity, toughness, and tracking resistance and are thus preferred.

The amount of terminal carboxyl group in the polybutylene terephthalate resin may be established through selection as appropriate, but is generally not more than 60 eq/ton, preferably not more than 50 eq/ton, and more preferably not more than 30 eq/ton. At above 50 eq/ton, the alkali resistance and hydrolysis resistance decline, and in addition gas generation during melt molding of the resin composition is facilitated. The lower limit for the amount of terminal carboxyl group is not specifically stipulated, but is generally 10 eq/ton considering the productivity during production of the polybutylene terephthalate resin.

The amount of terminal carboxyl group in the polybutylene terephthalate resin is the value measured by dissolving 0.5 g of the polyalkylene terephthalate resin in 25 mL of benzyl alcohol and titrating using a 0.01 mol/l benzyl alcohol solution of sodium hydroxide. With regard to methods for adjusting the amount of terminal carboxyl group, this may be carried out by any heretofore known method, e.g., methods in which adjustments are made to the polymerization conditions, e.g., the starting material charge ratios for polymerization, the polymerization temperature, the pressure reduction procedure, and so forth, and methods in which reaction with a terminal-capping agent is carried out.

The intrinsic viscosity of the polybutylene terephthalate resin is preferably 0.5 to 2 dl/g. An intrinsic viscosity in the range from 0.6 to 1.5 dl/g is more preferred from the standpoints of the moldability and mechanical properties. The resulting resin composition readily takes on a low mechanical strength when a polybutylene terephthalate resin having an intrinsic viscosity lower than 0.5 dl/g is used. At above 2 dl/g, the resin composition takes on a poor fluidity and the moldability may then deteriorate.

The intrinsic viscosity of the polybutylene terephthalate resin (A) is the value measured at 30° C. in a mixed solvent of 1:1 (mass ratio) tetrachloroethane and phenol.

The polybutylene terephthalate resin can be produced by melt polymerization, by a batch procedure or a continuous procedure, between a dicarboxylic acid component in which the main component is terephthalic acid, or an ester derivative of this dicarboxylic acid component, with a diol component in which the main component is 1,4-butanediol. In addition, after a low molecular weight polybutylene terephthalate resin has been produced by the melt polymerization, the degree of polymerization (or molecular weight) may then also be increased to a desired value by carrying out an additional solid-phase polymerization under a nitrogen current or under reduced pressure.

The polybutylene terephthalate resin is preferably obtained by a production method in which a melt polycondensation is carried out by a continuous procedure between a dicarboxylic acid component having terephthalic acid as its main component and a diol component having 1,4-butanediol as its main component.

The catalyst used during execution of the esterification reaction may be a heretofore known catalyst, for example, a titanium compound, tin compound, magnesium compound, calcium compound, and so forth. Titanium compounds are particularly advantageous thereamong. Specific examples of titanium compounds for use as the esterification catalyst are titanium alcoholates, e.g., tetramethyl titanate, tetraisopropyl titanate, and tetrabutyl titanate, and titanium phenolates such as tetraphenyl titanate.

The polycarbonate resin is a possibly branched thermoplastic polymer or copolymer obtained by the reaction of a dihydroxy compound, or a dihydroxy compound and a small amount of a polyhydroxy compound, with phosgene or a carbonate diester. There are no particular limitations on the method for producing the polycarbonate resin, and a polycarbonate resin produced by a heretofore known phosgene method (interfacial polymerization) or melt method (transesterification) can be used.

The starting dihydroxy compound substantially does not contain the bromine atom, and is preferably an aromatic dihydroxy compound. Specific examples are 2,2-bis(4-hydroxyphenyl) propane (=bisphenol A), tetramethylbisphenol A, bis(4-hydroxyphenyl)-p-diisopropylbenzene, hydroquinone, resorcinol, and 4,4-dihydroxydiphenyl, with bisphenol A being preferred. A compound may also be used in which one or more tetraalkylphosphonium sulfonates are bonded in an aromatic dihydroxy compound as described above.

Preferred thereamong for the polycarbonate resin are aromatic polycarbonate resins derived from 2,2-bis(4-hydroxyphenyl) propane and aromatic polycarbonate copolymers derived from 2,2-bis(4-hydroxyphenyl) propane and another aromatic dihydroxy compound. In addition, the polycarbonate resin may be a copolymer in which the main portion is an aromatic polycarbonate resin, e.g., a copolymer with a siloxane structure-bearing polymer or oligomer. A mixture of two or more species of the aforementioned polycarbonate resins may also be used.

A monohydric aromatic hydroxy compound, for example, m-methylphenol, p-methylphenol, m-propylphenol, p-propylphenol, p-tert-butylphenol, and phenol p-substituted by a long-chain alkyl group, may be used in order to adjust the molecular weight of the polycarbonate resin.

The viscosity-average molecular weight (Mv) of the polycarbonate resin is preferably at least 13,000, more preferably at least 13,500, still more preferably at least 14,000, and particularly preferably at least 15,000. When a polycarbonate resin having a viscosity-average molecular weight lower than 13,000 is used, the resulting resin composition readily takes on a low mechanical strength, e.g., impact resistance. Mv is preferably not more than 60,000, more preferably not more than 40,000, and still more preferably not more than 35,000. At above 60,000, the resin composition takes on a poor fluidity and the moldability may then deteriorate.

The viscosity-average molecular weight (Mv) of the polycarbonate resin refers in the present invention to the value calculated using Schnell's viscosity equation, see below, wherein the intrinsic viscosity ($[\eta]$) is determined by measuring the viscosity of a methylene chloride solution of the polycarbonate resin at 25° C. using a Ubbelohde viscometer.

$$[\eta]=1.23\times10^{-4}Mv^{0.83}$$

There are no particular limitations on the method for producing the polycarbonate resin, and a polycarbonate resin produced by either a phosgene method (interfacial polymerization method) or a melt method (transesterification method) may be used. A polycarbonate resin is also preferred as provided by the execution, on a polycarbonate resin produced by a melt method, of a post-treatment that adjusts the amount of terminal OH group.

When the thermoplastic resin (A) does contain a polycarbonate resin, the polycarbonate resin content, based on a total of 100 parts by mass for the polybutylene terephthalate resin and polycarbonate resin, is preferably 5 to 50 parts by mass, more preferably at least 10 parts by mass, still more preferably at least 15 parts by mass, and particularly preferably at least 20 parts by mass, and is more preferably less than 50 parts by mass, still more preferably not more than 45 parts by mass, and particularly preferably not more than 40 parts by mass.

The polybutylene terephthalate resin content, based on a total of 100 parts by mass for the polybutylene terephthalate resin and polycarbonate resin, is polybutylene terephthalate resin at preferably 50 to 95 parts by mass, more preferably more than 50 parts by mass, still more preferably at least 55 parts by mass, and particularly preferably at least 60 parts by mass, and more preferably not more than 90 parts by mass, still more preferably not more than 85 parts by mass, and particularly preferably not more than 80 parts by mass.

At a content in the aforementioned ranges, the alkali resistance and two-color moldability (joining strength) are substantially improved and the impact resistance is also excellent. A poor fluidity occurs at above 50 parts by mass, and when the content of the alkali-resistant polycarbonate resin is less than 5 parts by mass, obtaining a satisfactory joining strength in two-color molding is impaired and a decline in the dimensional stability is also facilitated. In addition, at above 50 parts by mass, a poor fluidity is readily assumed and a worsening of the alkali resistance is also facilitated.

[Elastomer (B)]

The polybutylene terephthalate resin composition according to the present invention may contain an elastomer (B).

Thermoplastic elastomers used to improve the impact resistance of polyester resin by incorporation therein may be used as the elastomer (B), and, for example, a rubbery polymer, or an elastomer provided by the copolymerization of a rubbery polymer with a compound reactive therewith, can be used.

The glass transition temperature of the elastomer (B) is preferably equal to or less than 0° C. and particularly preferably equal to or less than −20° C.

Specific examples of the elastomer (B) are as follows: copolymers between ethylene and unsaturated carboxylate ester (e.g., ethylene-methacrylate copolymer, ethylene-butyl acrylate copolymer); copolymers between ethylene and an aliphatic vinyl compound; terpolymers of ethylene, propylene, and nonconjugated diene; acrylic rubbers (e.g., polybutyl acrylate, poly(2-ethylhexyl acrylate), butyl acrylate-2-ethylhexyl acrylate copolymer); polybutadiene; polyisoprene; dienic copolymers (e.g., styrene-butadiene copolymer, acrylonitrile-butadiene copolymer, acrylic-butadiene rubber); copolymers between ethylene and α-olefin having at least three carbons (e.g., ethylene-propylene copolymer, ethylene-butene copolymer, ethylene-octene copolymer); and silicone rubbers (polyorganosiloxane rubber, IPN composite rubbers composed of a polyorganosiloxane rubber and polyalkyl (meth)acrylate rubber). A single species of these may be used by itself or two or more may be used in combination.

In this Description, (meth)acrylate refers to acrylate and methacrylate, and (meth)acrylic acid refers to acrylic acid and methacrylic acid.

Copolymers provided by the polymerization of a monomer compound into a rubbery polymer are another example of the elastomer (B). This monomer compound can be exemplified by aromatic vinyl compounds, vinyl cyanide compounds, (meth)acrylate ester compounds, and (meth)acrylic acid compounds. Additional examples are epoxy group-containing (meth)acrylate ester compounds such as glycidyl (meth)acrylate; maleimide compounds such as maleimide, N-methylmaleimide, and N-phenylmaleimide; and α,β-unsaturated carboxylic acid compounds such as maleic acid, phthalic acid, and itaconic acid, and their anhydrides (for example, maleic anhydride). A single one of these monomer compounds may be used by itself or two or more may be used in combination.

The elastomer (B) is preferably a copolymer between ethylene and an unsaturated carboxylate ester, more preferably an ethylene-alkyl acrylate copolymer, and most preferably an ethylene-butyl acrylate copolymer. From the standpoints of improving the impact resistance and improving the heat shock resistance, the butyl acrylate content is preferably at least 10 mass % and more preferably at least 20 mass %. From the standpoint of improving the fluidity, the MFR of the ethylene-butyl acrylate copolymer is preferably at least 10 g/10 min and more preferably at least 20 g/min.

The use of such elastomers sets up a trend of providing an excellent impact resistance, fluidity, and heat shock resistance and is thus preferred.

A single one of these elastomers may be used by itself or two or more may be used in combination.

The content of the elastomer (B), per 100 parts by mass of the thermoplastic resin (A), is 0 to 30 parts by mass and preferably 5 to 30 parts by mass. The incorporation of the elastomer (B) can improve the impact resistance and the heat shock resistance. There tends to be little effect with regard to improving the impact resistance and heat shock resistance at an elastomer (B) content of less than 5 parts by mass, while the heat ageing resistance, rigidity, fluidity, and flame retardancy readily decline when 30 parts by mass is exceeded. The elastomer (B) content is more preferably at least 7 parts by mass and particularly is at least 10 parts by mass and is more preferably not more than 25 parts by mass and particularly is not more than 20 parts by mass.

[(C) Epoxy Compound]

The epoxy compound (C) used in the present invention serves to inhibit reductions in, for example, the mechanical strength and so forth, that occur concomitantly when the polybutylene terephthalate resin is subject to hydrolysis and a reduction in its molecular weight occurs. As a consequence, through the incorporation of the epoxy compound (C), a synergistic effect is promoted with the elastomer (B) and with the (E) masterbatch containing a silicone compound and thermoplastic resin, and the alkali resistance and heat shock resistance can then be improved still further.

The epoxy compound (C) should have one or more epoxy groups in each molecule and the following may generally be used: compounds provided by the epoxidation of olefinic double bonds and glycidyl compounds that are the reaction products of epichlorohydrin with, e.g., an alcohol, a phenol, or a carboxylic acid.

The epoxy compound (C) can be exemplified by novolac epoxy compounds, bisphenol A epoxy compounds, bisphenol F epoxy compounds, alicyclic epoxy compounds, glycidyl ethers, glycidyl esters, epoxidized butadiene polymers, and resorcinol epoxy compounds.

The novolac epoxy compounds can be exemplified by phenol novolac epoxy compounds and cresol novolac epoxy compounds.

The bisphenol A epoxy compounds can be exemplified by bisphenol A-diglycidyl ether and hydrogenated bisphenol A-diglycidyl ether, and the bisphenol F epoxy compounds can be exemplified by bisphenol F-diglycidyl ether and hydrogenated bisphenol F-diglycidyl ether.

The alicyclic epoxy compounds can be exemplified by vinylcyclohexene dioxide, dicyclopentadiene oxide, 3,4-epoxycyclohexyl 3,4-cyclohexylcarboxylate, bis(3,4-epoxycyclohexylmethyl) adipate, vinylcyclohexene diepoxide, and 3,4-epoxycyclohexyl glycidyl ether.

Specific examples of the glycidyl ethers are monoglycidyl ethers such as methyl glycidyl ether, butyl glycidyl ether, 2-ethylhexyl glycidyl ether, decyl glycidyl ether, stearyl glycidyl ether, phenyl glycidyl ether, butylphenyl glycidyl ether, and allyl glycidyl ether, and diglycidyl ethers such as neopentyl glycol diglycidyl ether, ethylene glycol diglycidyl ether, glycerol diglycidyl ether, propylene glycol diglycidyl ether, and bisphenol A diglycidyl ether.

The glycidyl esters can be exemplified by monoglycidyl esters such as glycidyl benzoate ester and glycidyl sorbate ester, and by diglycidyl esters such as diglycidyl adipate ester, diglycidyl terephthalate ester, and diglycidyl orthophthalate ester.

The epoxidized butadiene polymers can be exemplified by epoxidized polybutadiene, epoxidized styrene-butadiene copolymer, and epoxidized hydrogenated styrene-butadiene copolymer.

The resorcinol epoxy compounds can be exemplified by resorcinol diglycidyl ether.

The epoxy compound (C) may be a copolymer for which a glycidyl group-containing compound is one component. An example is a copolymer between the glycidyl ester of an α,β-unsaturated acid and one or two or more monomers selected from the group consisting of α-olefins, acrylic acid, acrylate esters, methacrylic acid, and methacrylate esters.

Epoxy compounds having an epoxy equivalent weight of 50 to 10,000 g/eq and a weight-average molecular weight of not more than 8,000 are preferred for the epoxy compound (C). The amount of the epoxy group is too high when the epoxy equivalent weight is less than 50 g/eq and the resin composition assumes a high viscosity as a result. Conversely, when the epoxy equivalent weight exceeds 10,000 g/eq, little epoxy group is then present and this tends to impair the development of satisfactory effects with regard to improving the alkali resistance, heat shock resistance, and hydrolysis resistance of the polybutylene terephthalate resin composition. The epoxy equivalent weight is more preferably 100 to 7,000 g/eq, still more preferably 100 to 5,000 g/eq, and most preferably 100 to 3,000 g/eq. In addition, when the weight-average molecular weight exceeds 8,000, the compatibility with the polybutylene terephthalate resin then declines and the mechanical strength of the molded article assumes a declining trend. The weight-average molecular weight is more preferably not more than 7,000 and still more preferably not more than 6,000.

The epoxy compound (C) is preferably a bisphenol A epoxy compound or novolac epoxy compound as obtained by the reaction of epichlorohydrin with bisphenol A or a novolac. Novolac epoxy compounds readily improve the alkali resistance and are particularly preferred from the standpoints of the hydrolysis resistance, heat shock resistance, and appearance of the molded article surface.

The content of the epoxy compound (C), per 100 parts by mass of the thermoplastic resin (A), is 0.3 to 4 parts by mass, preferably at least 0.4 parts by mass, more preferably at least 0.5 parts by mass, and still more preferably at least 0.6 parts by mass. It is preferably not more than 3.5 parts by mass, more preferably not more than 3 parts by mass, still more preferably not more than 2.5 parts by mass, and particularly preferably not more than 2.2 parts by mass. A reduction in the alkali resistance and a reduction in the hydrolysis resistance readily occur when the content of the epoxy compound (C) is less than 0.3 parts by mass, while at more than 4 parts by mass crosslinking develops and the fluidity during molding readily deteriorates.

Moreover, the equivalent weight ratio (epoxy group/COOH group) for the epoxy group in the epoxy compound (C) to the terminal COOH group in the polybutylene terephthalate resin is preferably in the range from 0.2 to 2.7. The hydrolysis resistance readily deteriorates when this equivalent weight ratio is less than 0.2; the moldability readily becomes unstable at greater than 2.7. Epoxy group/COOH group is more preferably at least 0.3 and not more than 2.5.

[(D) Reinforcing Filler]

The polybutylene terephthalate resin composition according to the present invention contains a reinforcing filler (D) in the range from 15 to 80 parts by mass per 100 parts by mass of the thermoplastic resin (A). The content of the reinforcing filler (D) is preferably at least 20 parts by mass, more preferably at least 30 parts by mass, and still more preferably at least 40 parts by mass, and is preferably not more than 75 parts by mass and more preferably not more than 70 parts by mass.

In the present invention, the reinforcing filler refers to a filler that upon its incorporation in the resin component brings about an improvement in the strength and rigidity, and it may have any morphology, e.g., fibrous, plate shape, particulate, irregular shape, and so forth.

When the reinforcing filler (D) has a fibrous morphology, it may be inorganic or organic. For example, this includes inorganic fibers such as glass fiber, carbon fiber, silica·alumina fiber, zirconia fiber, boron fiber, boron nitride fiber, silicon nitride potassium titanate fiber, metal fiber, wollastonite, and so forth, and organic fibers such as fluororesin fiber, aramid fiber, and so forth. When the reinforcing filler (D) has a fibrous shape, inorganic fibers are then preferred with glass fiber being particularly preferred. The reinforcing filler (D) may be a single species or a mixture of two species.

When the reinforcing filler (D) has a fibrous morphology, there are no particular limitations on its average fiber diameter, average fiber length, or cross-sectional shape; however, the average fiber diameter is preferably selected, for example, from the range of 1 to 100 μm and the average fiber length is preferably selected, for example, from the range of 0.1 to 20 mm. The average fiber diameter is more preferably approximately 1 to 50 μm and still more preferably approximately 5 to 20 μm. The average fiber length is preferably approximately 0.12 to 10 mm. When the fiber cross section has a flattened shape, e.g., an oval shape, elliptical shape, cocoon shape, and so forth, the flatness ratio (major axis/minor axis ratio) is preferably 1.4 to 10, more preferably 2 to 6, and still more preferably 2.5 to 5. The use of glass fiber having such a modified cross section facilitates improvements in molded article warping and in dimensional stability, e.g., shrinkage ratio anisotropy, and is thus preferred.

In addition to the fibrous reinforcing filler described in the preceding, other plate-shaped, particulate, or irregularly shaped reinforcing filler may also be incorporated. Plate-shaped inorganic fillers exhibit an ability to reduce anisotropy and warping and can be exemplified by glass flake, talc, mica, kaolin, metal foil, and so forth. Glass flake is preferred among the plate-shaped inorganic fillers.

The other particulate or irregularly shaped inorganic filler can be exemplified by ceramic beads, asbestos, clay, zeolite, potassium titanate, barium sulfate, titanium oxide, silicon oxide, aluminum oxide, and magnesium hydroxide.

In order to improve the adherence at the interface between the reinforcing filler (D) and the resin component, preferably the surface of the reinforcing filler (D) is treated with a surface treatment agent, e.g., a sizing agent and so forth. The surface treatment agent can be exemplified by epoxy resins, acrylic resins, and urethane resins and by functional compounds, e.g., isocyanate compounds, silane compounds, titanate compounds, and so forth.

An epoxy resin is preferably used for the surface treatment in the present invention. The epoxy resin is preferably a novolac epoxy compound, e.g., a phenol novolac epoxy compound or cresol novolac epoxy compound, or a bisphenol A epoxy resin. The co-use of a novolac epoxy compound with a bisphenol epoxy resin is more preferred, and the co-use of a phenol novolac epoxy compound with a bisphenol A epoxy resin is preferred from the standpoints of the alkali resistance, hydrolysis resistance, and mechanical properties.

The functional compound is preferably a silane coupling agent, e.g., an aminosilane coupling agent, epoxysilane coupling agent, allylsilane coupling agent, vinylsilane coupling agent, and so forth, with aminosilane compounds being more preferred.

γ-aminopropyltriethoxysilane, γ-aminopropyltrimethoxysilane, γ-glycidoxypropyltrimethoxysilane, and γ-(2-aminoethyl)aminopropyltrimethoxysilane are preferred for the aminosilane compound, with γ-aminopropyltriethoxysilane and γ-glycidoxypropyltrimethoxysilane being particularly preferred.

The use of a novolac epoxy resin and a bisphenol epoxy resin as the so-called sizing agent and the use of a reinforcing filler that has been subjected to surface treatment with an aminosilane compound as the coupling agent, are particularly preferred in the present invention from the standpoints of the alkali resistance and hydrolysis resistance. By configuring the surface treatment agent in this manner, interfacial adherence between the reinforcing filler (D) and epoxy resin is increased because the inorganic functional groups in the aminosilane compound are highly reactive with the surface of the reinforcing filler (D), the organic functional groups in the aminosilane are highly reactive with the glycidyl groups of the epoxy resin, and the glycidyl groups of the epoxy resin suitably react with the polybutylene terephthalate resin. The result is that an increase in the alkali resistance, hydrolysis resistance, and mechanical properties of the resin composition according to the present invention is facilitated.

In addition, for example, a urethane resin, acrylic resin, antistatic agent, lubricant, water repellant, and so forth may also be incorporated in the surface treatment agent within a range that does not deviate from the gist of the present invention, with the use of a urethane resin being preferred when such an additional component is incorporated.

Treatment of the surface of the reinforcing filler (D) may be carried out by a heretofore known method. For example, a preliminary treatment of the surface may be performed using a surface treatment agent as described above, or surface treatment may be carried out by adding the surface treatment agent separately from the untreated reinforcing filler (D) during preparation of the polybutylene terephthalate resin composition according to the present invention.

The amount of attachment of the surface treatment agent with reference to the reinforcing filler (D) is preferably 0.01 to 5 mass % and more preferably 0.05 to 2 mass %. The basis for this preference is that the mechanical strength tends to be more effectively improved by the use of at least 0.01 mass %, while the use of not more than 5 mass % provides a necessary and sufficient effect and establishes a trend of facilitating production of the resin composition.

[(E) Masterbatch Containing a Silicone Compound and Thermoplastic Resin]

A masterbatch (E) of a silicone compound with a weight-average molecular weight of 10,000 to 80,000 and a thermoplastic resin is blended in the polybutylene terephthalate resin composition according to the present invention. Specifically, blending is carried out as a masterbatch in the form of pellets in which the silicone compound is dispersed in the thermoplastic resin.

When a silicone compound is blended in liquid form into a composition, the silicone compound becomes uniformly microdispersed in the molded article and as a consequence the silicone compound has a low probability of occurrence at the molded article surface and the alkali resistance and hydrolysis resistance are then low. Also, because the silicone compound readily bleeds out to the surface, the problem of a deterioration in the surface appearance is readily produced. This becomes more significant in the particular case where the molded article is a metal member-resin composite article, and the heat shock resistance is also inferior because residual stress is readily produced at the metal member/resin interface. The deterioration in surface appearance and silicone bleed out cause a reduction in the joining strength in the case of two-color molding. According to the present invention, on the other hand, when the silicone compound is blended as a masterbatch into the composition, the silicone compound has a high probability of occurrence at the molded article surface, and the hydrolysis resistance and alkali resistance are improved as a result. Moreover, in the case of a metal-resin composite article, the residual stress is substantially reduced and the heat shock resistance is very significantly improved, in addition to the hydrolysis resistance and alkali resistance. Bleed out is also inhibited and the surface appearance is not impaired and a uniform dispersion is made possible.

A silicone compound having a weight-average molecular weight (Mw) of 10,000 to 80,000 is used in the present invention: the heat shock resistance and alkali resistance are poor when Mw is less than 10,000, while the heat shock resistance and the surface appearance of the molded article are poor at above 80,000.

The Mw of the silicone compound is preferably at least 20,000, more preferably at least 30,000, and still more preferably at least 40,000, and is preferably not more than 75,000, more preferably not more than 70,000, and still more preferably not more than 65,000.

The silicone compound used in the masterbatch according to the present invention is an organosilicon compound that has a siloxane bond skeleton with, for example, organic groups directly bonded to the silicon thereof. For example, the methyl group, ethyl group, phenyl group, vinyl group, trifluoropropyl group, and combinations thereof are known for the organic groups directly bonded to the silicon, and known siloxane compounds bearing same can be used without particular limitation. Also usable are siloxane compounds in which a portion of the organic groups have been substituted by a substituent bearing, for example, an epoxy group, amino group, polyether group, carboxyl group, mercapto group, ester group, chloroalkyl group, alkyl group having three or more carbons, or hydroxyl group. A single siloxane compound may be used by itself or a combination of two or more may be used.

Siloxane compounds are categorized into silicone oils, silicone elastomers, and silicone resins (refer as necessary to "Silicone Materials Handbook", edited by Toray Dow Corning Co., Ltd., published August, 1993), and any of these may be used in the present invention with silicone resins and silicone oils being preferred.

Silicone oils can be specifically exemplified by oily silicones such as dimethylsilicone oil, phenylmethylsilicone oil, alkyl-modified silicone oil, fluorosilicone oil, polyether-modified silicone oil, aliphatic ester-modified silicone oil, amino-modified silicone oil, carboxylic acid-modified silicone oil, carbinol-modified silicone oil, epoxy-modified silicone oil, and mercapto-modified silicone oil.

The thermoplastic resin used in the masterbatch according to the present invention is preferably a resin that is incompatible with polybutylene terephthalate resin. By using a resin incompatible with polybutylene terephthalate for the masterbatch, the silicone compound will then be present in a high concentration in the incompatible resin dispersed in the polybutylene terephthalate, and the effects, e.g., alkali resistance and so forth, appear even more readily as a result. Usable thermoplastic resins can be exemplified by polyolefin resins, polyamide resins, styrenic resins, polyimide resins, polyetherimide resins, polyurethane resins, polyphenylene ether resins, polyphenylene sulfide resins, polysulfone resins, and polymethacrylate resins. Polyolefin resins are particularly preferred for bringing about the expression of the various effects of the present invention.

Various polyolefin resins can be used as this polyolefin resin, and preferred examples in this regard are ethylene homopolymers; propylene homopolymers; polyethylene resins, e.g., ethylene copolymers of ethylene with propylene, butene, hexene, octene, or vinyl acetate; and polypropylene resins, e.g., propylene copolymers of propylene with butene, hexene, or octene. Preferred specific examples of polyethylene resins are high-density polyethylene (HDPE), low-density polyethylene (LDPE), linear low-density polyethylene (LLDPE), and ethylene-vinyl acetate copolymers (EVA). Preferred examples of polypropylene resins are polypropylene and propylene-ethylene copolymers.

Polyethylene resins are preferred, with high-density polyethylene (HDPE), low-density polyethylene (LDPE), and linear low-density polyethylene (LLDPE) being more preferred and low-density polyethylene (LDPE) being particularly preferred.

There are no limitations on the method for producing the polyolefin resin or on the polymerization catalyst. The polyolefin resin may be provided using various known methods, e.g., solution methods, bulk methods, gas phase methods, high-pressure methods, and so forth, and using any of, e.g., a radical initiator, Ziegler catalyst, chromium catalyst, metallocene catalyst, and so forth.

A single species of polyolefin resin may be used by itself or a mixture of two or more species may be used.

A heretofore known method can be employed for the method of producing the masterbatch, for which examples are methods that carry out mixing using, e.g., a ribbon blender, Henschel mixer, Banbury mixer, drum tumbler, or short-screw or multi-screw extruder. Methods that use a Henschel mixer or a short-screw or multi-screw extruder are preferred, and methods in which pelletizing is performed after melt-kneading using a short-screw or multi-screw extruder are particularly preferred. The mechanical properties and slidability of the molded article tend to be further enhanced by melt-kneading during production, in addition to this masterbatching.

A commercial product may also be used for the (E) masterbatch containing the silicone compound and thermoplastic resin; for example, a selection may be used from, for example, the "Silicone Concentrate" (product name) series from Toray Dow Corning Co., Ltd.

The content of the silicone compound in the (E) masterbatch containing the silicone compound and thermoplastic resin is preferably 10 to 80 mass %, more preferably 20 to 70 mass %, still more preferably 20 to 60 mass %, and particularly preferably 20 to 50 mass %.

The content of the (E) masterbatch containing the silicone compound and thermoplastic resin, per 100 parts by mass of the thermoplastic resin (A), is 1 to 15 parts by mass, preferably 2 to 12 parts by mass, and more preferably 3 to 10 parts by mass. It is difficult to obtain a satisfactory improving effect for the alkali resistance at a content less than 1 parts by mass. At above 15 parts by mass, the extrudability and molding processability are inferior when the resin composition is produced by melt-kneading, and in addition the mechanical properties are also reduced.

[(F) Mold-Release Agent]

The polybutylene terephthalate resin composition according to the present invention preferably contains a mold-release agent. The heretofore known mold-release agents commonly used in polyester resins can be used as this mold-release agent, with polyolefin compounds and fatty acid ester compounds being preferred from the standpoint of obtaining a good alkali resistance and polyolefin compounds being particularly preferred.

The polyolefin compound is exemplified by compounds selected from paraffin waxes and polyethylene waxes, and those with a weight-average molecular weight of 700 to 10,000 and particularly 900 to 8,000 are preferred.

The fatty acid ester compounds can be exemplified by fatty acid esters such as the esters of saturated or unsaturated, monobasic or dibasic aliphatic carboxylic acid esters, glycerol fatty acid esters, sorbitan fatty acid esters, and so forth, and by the partial saponification products of the preceding. Preferred are fatty acid monoesters and diesters constituted of an alcohol and a fatty acid having 11 to 28 carbons and preferably 17 to 21 carbons.

The fatty acid can be exemplified by palmitic acid, stearic acid, caproic acid, caprylic acid, lauric acid, arachidic acid, behenic acid, lignoceric acid, cerotic acid, melissic acid, tetratriacontanoic acid, montanic acid, adipic acid, and azelaic acid. The fatty acid may be alicyclic.

The alcohol can be exemplified by saturated or unsaturated, monohydric or dihydric alcohols. The alcohol may have a substituent such as a fluorine atom or aryl group. Monohydric and polyhydric saturated alcohols having not more than 30 carbons are preferred, and aliphatic saturated monohydric alcohols and polyhydric alcohols having not more than 30 carbons are more preferred. Here, aliphatic includes alicyclic compounds.

The alcohol can be specifically exemplified by octanol, decanol, dodecanol, stearyl alcohol, behenyl alcohol, ethylene glycol, diethylene glycol, glycerol, pentaerythritol, 2,2-dihydroxyperfluoropropanol, neopentyl glycol, ditrimethylolpropane, and dipentaerythritol.

The ester compound may contain an aliphatic carboxylic acid and/or an alcohol as an impurity, and may be a mixture of a plurality of compounds.

The fatty acid ester compound can be specifically exemplified by glycerol monostearate, glycerol monobehenate, glycerol dibehenate, glycerol 12-hydroxymonostearate, sorbitan monobehenate, pentaerythritol monostearate, pentaerythritol distearate, stearyl stearate, and ethylene glycol montanite ester.

The content of the mold-release agent (F), per 100 parts by mass of the thermoplastic resin (A), is preferably 0.1 to 3 parts by mass, more preferably 0.2 to 2.5 parts by mass, and still more preferably 0.5 to 2 parts by mass. A reduction in surface properties due to poor mold release during melt molding readily occurs at less than 0.1 parts by mass. On the other hand, at above 3 parts by mass, the kneading processability of the resin composition readily declines and the generation of hazing of the molded article surface is facilitated.

[Stabilizer]

The polybutylene terephthalate resin composition according to the present invention preferably contains a stabilizer because this provides the effects of improving the heat stability and preventing deterioration of the mechanical strength, transparency, and hue. Sulfur stabilizers and phenolic stabilizers are preferred for the stabilizer.

Any heretofore known sulfur atom-containing compound can be used as the sulfur stabilizer, with thioethers being preferred. Specific examples are didodecyl thiodipropionate, ditetradecyl thiodipropionate, dioctadecyl thiodipropionate, pentaerythritol tetrakis(3-dodecylthiopropionate), thiobis(N-phenyl-β-naphthylamine), 2-mercaptobenzothiazole, 2-mercaptobenzimidazole, tetramethylthiuram monosulfide, tetramethylthiuram disulfide, nickel dibutyldithiocarbamate, nickel isopropylxanthate, and trilauryl trithiophosphite. Pentaerythritol tetrakis(3-dodecylthiopropionate) is preferred.

The phenolic stabilizer can be exemplified by pentaerythritol tetrakis(3-(3,5-di-t-butyl-4-hydroxyphenyl) propionate), octadecyl 3-(3,5-di-tert-butyl-4-hydroxyphenyl) propionate, thiodiethylenebis(3-(3,5-di-tert-butyl-4-hydrophenyl) propionate), and pentaerythritol tetrakis(3-(3, 5-di-neopentyl-4-hydroxyphenyl) propionate). Pentaerythritol tetrakis(3-(3,5-di-tert-butyl-4-hydroxyphenyl) propionate) and octadecyl 3-(3,5-di-tert-butyl-4-hydroxyphenyl) propionate are preferred.

A single species of stabilizer may be incorporated or two or more species may be incorporated in any combination and proportions therein.

The stabilizer content is preferably 0.001 to 2 parts by mass per 100 parts by mass of the thermoplastic resin (A). When the stabilizer content is less than 0.001 parts by mass, there is little expectation of improvement in the heat stability of the resin composition or in the compatibility and a reduction in molecular weight and a deterioration in color readily occur during molding. When 2 parts by mass is exceeded, the amount becomes excessive and there is a tendency for the occurrence of silver generation and color deterioration to be further facilitated. The stabilizer content is more preferably 0.01 to 1.5 parts by mass and still more preferably 0.1 to 1 parts by mass.

[Flame Retardant]

The polybutylene terephthalate resin composition according to the present invention can contain a flame retardant in order to provide flame retardancy. The flame retardant can be exemplified by organic halogen compounds, antimony compounds, phosphorus compounds, nitrogen compounds, and other organic and inorganic compounds. The organic halogen compounds can be specifically exemplified by brominated polycarbonates, brominated epoxy resins, brominated phenoxy resins, brominated polyphenylene ether resins, brominated polystyrene resins, brominated bisphenol A, and pentabromobenzyl polyacrylate.

The antimony compounds can be exemplified by antimony trioxide, antimony pentoxide, and sodium antimonate. Phosphorus compound flame retardants can be exemplified by phosphate esters, polyphosphoric acid, melamine polyphosphate, ammonium polyphosphate, metal phosphinate salts, and red phosphorus. The nitrogenous flame retardants can be exemplified by melamine cyanurate and phosphazene. Organic flame retardants and inorganic flame retardants other than the above can be exemplified by inorganic compounds such as aluminum hydroxide, magnesium hydroxide, silicon compounds, and boron compounds.

Other Components

Various heretofore known resin additives may also be incorporated, within a range in which the effects according to the present invention are not impaired, into the polybutylene terephthalate resin composition according to the present invention on an optional basis. These various resin additives can be exemplified by antioxidants, ultraviolet absorbers, weathering stabilizers, lubricants, colorants such as dyes and pigments, catalyst deactivators, static inhibitors, foaming agents, plasticizers, crystal nucleating agents, crystallization promoters, and so forth.

The method for producing the polybutylene terephthalate resin composition according to the present invention is not limited to a particular method. However, an example is a method in which (B) 0 to 30 parts by mass of an elastomer, (C) 0.3 to 4 parts by mass of an epoxy compound, (D) 15 to 80 parts by mass of a reinforcing filler, and (E) 1 to 15 parts by mass of a masterbatch containing a silicone compound with a weight-average molecular weight of 10,000 to 80,000 and a thermoplastic resin, are mixed with (A) 100 parts by mass of a thermoplastic resin containing a polybutylene terephthalate resin, and melting and kneading are then carried out. The melting/kneading method can be a method as commonly used for thermoplastic resins. The components (A) to (E) already described above can be used for each of the components (A) to (E) here.

The melting/kneading method can be exemplified by a method in which the aforementioned essential components and other components blended on an optional basis are mixed to uniformity using, for example, a Henschel mixer, ribbon blender, V-blender, or tumbler, followed by melting/kneading with, for example, a single-screw or multi-screw kneader/extruder, roll, Banbury mixer, or Labo Plastomill (Brabender). As necessary, the reinforcing filler (D) may be supplied from a side feeder on the kneader/extruder in order to suppress breakage of the reinforcing filler and enable dispersion, and this is thus preferred. The temperature and kneading time during melting/kneading can be selected in accordance with, for example, the type of component constituting the resin component, the component proportions, the type of melt-kneader, and so forth, but the temperature during melting/kneading is preferably in the range from 200° C. to 300° C. At above 300° C., thermal deterioration of the components becomes a problem, and the properties of the molded article may decline and/or the appearance may deteriorate.

The method for producing a desired molded article from the polybutylene terephthalate resin composition according to the present invention is not particularly limited, and the molding methods heretofore employed with thermoplastic resins may be employed. Examples here are injection molding methods, ultrahigh speed injection molding methods, injection compression molding methods, two-color molding methods, hollow molding methods such as gas-assisted molding, molding methods using insulated molds, molding methods using rapidly heated molds, foam molding (also including the use of supercritical fluids), insert molding, IMC (in-mold coating molding) molding methods, extrusion molding methods, sheet molding methods, thermoforming methods, rotational molding methods, laminate molding methods, press molding methods, and blow molding methods. Injection molding methods and two-color molding methods are preferred.

The polybutylene terephthalate resin composition according to the present invention in particular exhibits a high hot-melt adhesiveness and a low amount of deformation, and can therefore provide a two-color molded article that exhibits a high adhesive strength even when two-color molding is carried out using different resins. That is, a high adhesive strength can be imparted to a two-color molded article comprising a member (I) molded from the polybutylene terephthalate resin composition according to the present invention and a member (II) molded from a resin composition different from the polybutylene terephthalate resin composition of the member (I). A two-color molded article having a very high degree of adherence can be provided in the particular case that the resin composition constituting the member (II) is a resin composition that contains polycarbonate resin.

The composition described above for the present invention is particularly suitable for use for the production of a so-called metal insert molded article in which a metal member and a resin form a composite. This is due to the following: a resin layer composed of the composition according to the present invention, when formed into a composite with a metal member, can provide a low residual stress at the metal member/resin interface, which can thereby provide a molded article that exhibits an excellent heat shock resistance.

That is, the present invention also provides a metal-resin composite article in which a resin layer-comprising a resin composition that contains 100 parts by mass of the thermoplastic resin (A), (B) 0 to 30 parts by mass of an elastomer, (C) 0.3 to 4 parts by mass of an epoxy compound, (D) 15 to 80 parts by mass of a reinforcing filler, and (E) 1 to 15 parts by mass of a masterbatch containing a silicone compound with a weight—average molecular weight of 10,000 to 80,000 and a thermoplastic resin—is laminated to at least a portion of a metal member.

The metal-resin composite article according to the present invention can be molded by inserting a metal member, e.g., of stainless steel, aluminum, and so forth, into a mold and injecting therein a resin composition that contains the aforementioned (A) to (E).

Molded articles provided by molding the polybutylene terephthalate resin composition according to the present invention, and particularly composite articles in which a metal member forms a composite with a resin (metal insert molded articles), can achieve a very high alkali resistance and heat shock resistance—in alkali resistance testing, preferably at least 300 hours, more preferably at least 400 hours, and still more preferably at least 500 hours for the time until crack generation during immersion of the insert molded article in a 10% by mass aqueous NaOH solution; at least 280 cycles, preferably at least 300 cycles, more preferably at least 400 cycles, and still more preferably at least 450 cycles in heat shock resistance testing (number of cycles for crack generation at the weld line in −40° C.×30 min→130° C.×30 min heat cycling)—and therefore have excellent properties with respect to the properties required in particular of vehicle parts.

Molded articles that can be produced using the polybutylene terephthalate resin composition according to the present invention can be used in or for, e.g., various storage containers, electrical and electronic parts, OA equipment parts, home appliance parts, mechanical structural parts, building material parts, parts for precision equipment and instrumentation, automotive structural parts, sanitary parts, and so forth. They are particularly suitable for use in or for, e.g., food containers, chemical containers, containers for oil and fat products, hollow parts for vehicles, motor parts, various sensor parts, connector parts, switch parts, breaker parts, relay parts, coil parts, transformer parts, lamp parts, and so forth. They are even more suitable for molded articles for engine-adjacent onboard automotive parts, for example, various sensors, connectors, distributor parts, and ignition coil parts, and as a resin material for onboard parts such as casings and housings for the preceding.

[Production of Laser-Weldable Molded Articles]

The polybutylene terephthalate resin composition according to the present invention can be advantageously used for laser welding.

There are no particular limitations on the method for producing a laser-weldable molded article using the polybutylene terephthalate resin composition, and any method generally employed with polybutylene terephthalate resin compositions can be employed. Examples here are injection molding methods, ultrahigh speed injection molding methods, injection compression molding methods, two-color molding methods, hollow molding methods such as gas-assisted molding, molding methods using insulated molds, molding methods using rapidly heated molds, foam molding (also including the use of supercritical fluids), insert molding, IMC (in-mold coating molding) molding methods, extrusion molding methods, sheet molding methods, thermoforming methods, rotational molding methods, laminate molding methods, press molding methods, and blow molding methods. Injection molding methods are preferred. For example, a high speed injection molding method or injection compression molding method can be used for the injection molding method.

The laser-weldable molded article molded from the laser-weldable polybutylene terephthalate resin composition according to the present invention is provided to laser welding. The laser welding method is not particularly limited and can be carried out using common methods. Preferably, the obtained laser-weldable molded article is used for the absorption side (the absorption side member) and is brought into contact with the resin molded article constituting the mating member (the transmission side member), and the two molded articles are welded by irradiation with laser light to form a single body and provide one molded article. The part for welding, i.e., the injection-molded laser-weldable molded article (the absorption side member containing a laser light absorber) is brought into surfacewise contact or abutting contact with the transmission side member, i.e., the laser light-transmissive mating side, and generally the interface between the two is at least partially welded by irradiation with laser light through the transmission side member, which has a high transmittance, and a single body is provided by cooling to provide a single molded article.

The laser light absorber-containing absorption side member is a member comprising a thermoplastic resin composition that can absorb laser light and is melted by the absorption of laser light, and in specific terms the incorporation of an absorber, e.g., carbon black, or a laser light-absorptive dye is generally preferred in order to provide laser light absorptivity.

The content of the absorber, e.g., carbon black, is not particularly limited, but, for example, the incorporation of 0.2 to 1% by mass with reference to the resin composition is preferred.

Preferred examples of laser light-absorptive dyes are nigrosine, aniline black, phthalocyanine, naphthalocyanine, porphyrin, perylene, quaterrylene, azo dyes, anthraquinone, and squaric acid derivatives and immoniums.

The content of the laser light-absorptive dye, per 100 parts by mass of the resin component, is 0.001 to 0.2 parts by mass, preferably 0.003 to 0.1 parts by mass, and more preferably 0.005 to 0.05 parts by mass.

In order to obtain a higher weld strength, preferably both the absorption side member and the transmission side member are the polybutylene terephthalate resin composition according to the present invention, the absorption side member contains an absorber such as carbon black or a laser light-absorptive dye, and the transmission side member does not contain a colorant or contains a colorant that can transmit and absorb laser light (a laser light-transmissive/absorptive colorant). Such members have the same composition except for the presence/absence of the absorber, absorptive dye, or colorant, and because of this the welded members readily match each other and are more strongly bonded to each other.

The absorption side member and transmission side member are not limited to the same resin composition, and, insofar as the weld strength and airtightness are satisfied, a resin composition different from the resin composition according to the present invention may also be employed for the transmission side member from the standpoints of, e.g., the appearance, low warpage, and so forth.

The laser light-transmissive/absorptive colorant which may be incorporated in the transmission side member can be exemplified by various organic dyes/pigments, e.g., azines such as nigrosine and aniline black, phthalocyanines, naphthalocyanines, porphyrins, quaterrylenes, azo systems, azomethines, anthraquinones, squaric acid derivatives and immoniums, quinacridones, dioxazines, diketopyrrolopyroles, anthrapyridones, isoindolinones, indanthrones, perinones, perylenes, indigo systems, thioindigo systems, quinophthalones, quinolines, and triphenylmethanes. The content of the laser light-transmissive/absorptive dye, per 100 parts by mass of the resin component, is 0.0005 to 5.0 parts by mass, preferably 0.001 to 4.0 parts by mass, and more preferably 0.005 to 3.0 parts by mass.

In the present invention, "dye/pigment" means a dye or pigment.

The type of laser light that is irradiated may be any type as long as it is near-infrared laser light, and a YAG (yttrium·aluminum·garnet crystal) laser (1064 nm wavelength), LD (laser diode) laser (808 nm, 840 nm, 940 nm wavelengths), and so forth can be preferably used.

The molded article provided by the formation of a single article by laser welding may have any shape, size, thickness, and so forth. The welded article is suitably applied to or for, for example, electrical parts for transportation equipment such as automobiles, electrical and electronic equipment parts, industrial machinery parts, parts for consumer goods, and the like, and is particularly suitable for onboard vehicle parts.

EXAMPLES

The present invention is described more particularly in the following based on examples and comparative examples, but this should not be construed to mean that the present invention is limited to or by the following descriptive examples.

The starting components used in the examples and comparative examples are described in Table 1 below.

TABLE 1

| component | designation | |
|---|---|---|
| (A) thermoplastic resin | A1-1 | polybutylene terephthalate resin Mitsubishi Engineering-Plastics Corporation, NOVADURAN 5008 intrinsic viscsosity = 0.85 dl/g, terminal carboxyl group content = 12 eq/ton |
| | A1-2 | polybutylene terephthalate resin Mitsubishi Engineering-Plastics Corporation, NOVADURAN 5007 intrinsic viscsosity = 0.70 dl/g, terminal carboxyl group content = 10 eq/ton |
| | A2 | polycarbonate resin Mitsubishi Engineering-Plastics Corporation, IUPILON H4000FN Mv: 16,000 |
| (B) elastomer | B1 | Arkema, product name 35BA40 ethylene-acrylic ester copolymer (EBA) |
| (C) epoxy compound | C1 | Mitsubishi Chemical Corporation, product name Epikote 1003 bisphenol A-diglycidyl ether epoxy compound epoxy equivalent weight = approximately 670 to 770 g/eq, mass-average molecular weight = 1300 |
| | C2 | Nippon Steel Chemical & Material Co., Ltd., product name YDCN704 cresol novolac epoxy resin epoxy equivalent weight = approximately 202 to 214 g/eq, number-average molecular weight = approximately 1300 |
| (D) reinforcing filler | D | glass fiber, Nippon Electric Glass Co., Ltd., product name T-127 chopped strand glass fiber with average fiber diameter of 13 μm treated with novolac epoxy resin |
| (E) silicone compound | E1 | Toray Dow Corning Co., Ltd., product name MB25-502 masterbatch with LDPE resin base, containing 25% silicone Mw of silicone = 50,000 to 60,000 |
| | E2 | Shin-Etsu Chemical Co., Ltd., product name KF-96-100CS, liquid Mw = 6,000 |
| | E3 | Toray Dow Corning Co., Ltd., product name BY27-002 masterbatch with LDPE resin base, containing 50% silicone Mw of silicone = 100,000 |
| (F) mold-release agent | F | microcrystalline wax Nippon Seiro Co., Ltd., product name Himic 1080, melting point = 84° C. |
| (G) stabilizer | G | pentaerythritol tetrakis [3-(3,5-di-tert-butyl-4-hydroxyphenyl)propionate] BASF, product name Irganox 1010 |

Examples 1 to 4 and Comparative Examples 1 to 3

Production of Polybutylene Terephthalate Resin Compositions

The components described in Table 1, other than the glass fiber, were blended in the proportions (parts by mass in all instances) given in Table 2 below and were melt-kneaded using a vented 30-mm twin-screw extruder (TEX30α twin-screw extruder, from The Japan Steel Works, Ltd.) at a barrel temperature of 270° C. with the glass fiber being fed from a side feeder. After extrusion in strand form, pelletization was carried out using a strand cutter to obtain pellets of the polybutylene terephthalate resin composition.

Measurement and Evaluation Methods

The various properties and characteristics in the examples and comparative examples were measured and evaluated using the following methods.
(a) Charpy Impact Strength (unit: KJ/m$^2$):

The obtained pellets were dried for 6 hours at 120° C., and an ISO test specimen for measurement of the Charpy impact strength was then molded using an "NEX80-9E" injection molder from Nissei Plastic Industrial Co., Ltd. and using conditions of a cylinder temperature of 250° C. and a mold temperature of 80° C. The notched Charpy impact strength was measured in accordance with ISO 179.

(b) Evaluation of Hydrolysis Resistance: Tensile Strength Retention Ratio (unit:%):

An ISO test specimen was fabricated using an "NEX80-9E" injection molder from Nissei Plastic Industrial Co., Ltd., a cylinder temperature of 250° C., and a mold temperature of 80° C., and tensile testing was carried out in accordance with ISO 527.

In addition, the described ISO test specimen was subjected to a wet heat treatment for 100 hours at a pressure of 203 kPa in saturated steam at a temperature of 121° C. The tensile strength was measured in accordance with ISO 527 on the ISO test specimen before and after the wet heat treatment.

The tensile strength retention ratio (unit:%) was determined using the following formula.

tensile strength retention ratio (%)=(tensile strength after treatment/tensile strength before treatment)×100

(c) Heat Shock Resistance Test (unit: cycles)

Figure 2:
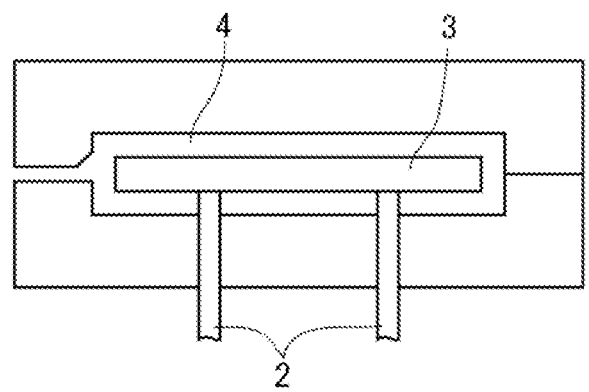
FIG. 2 is a descriptive cross-sectional diagram of a mold cavity in which an insert is supported by support pins.
Figure 3:
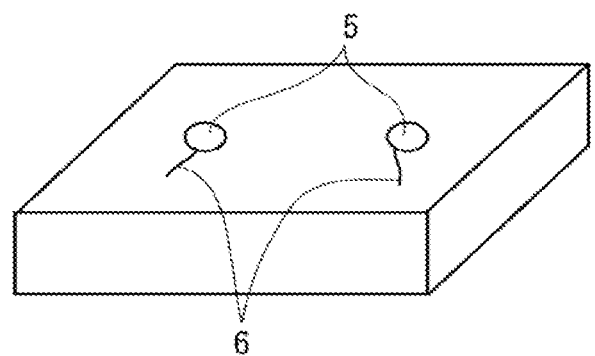
FIG. 3 is a schematic diagram of an insert molded article in which two weld lines have been produced at the support pin footprints.

The obtained pellets were dried for 6 hours at 120° C., after which, using a "TH60 R5VSE" from Nissei Plastic Industrial Co., Ltd. and a cylinder temperature of 250° C. and a mold temperature of 80° C., an iron (SUS) insert 1 in the shape of a rectangular parallelepiped and shown in FIG. 1 (length 16 mm×width 33 mm×thickness 3 mm) was inserted by introduction into a mold cavity 4 with support pins 2 (insert iron piece 3), as shown in FIG. 2. The insert molded article (length 18 mm×width 35 mm×thickness 5 mm) shown in FIG. 3 was fabricated by insert molding. The thickness of the resin portion of this insert molded article is 1 mm.

Two weld lines 6 are produced at the support pin outlines 5 in the insert molded article. Heat shock resistance testing was performed using this insert molded article and a "DTS-30" thermal shock tester from Irie Corporation.

Heat shock testing was performed using a cycle of 30 min at −40° C.→30 min at 130° C. for the heat shock resistance test conditions, and the average value for the number of cycles for crack generation for a total of 10 weld lines in five welded articles was reported.

(d) Alkali Resistance Evaluation:

An insert molded article obtained using the same method as in the aforementioned (c) Heat shock resistance test, was immersed in an aqueous NaOH solution having a concentration of 10% by mass. After immersion, the time (hr) until crack generation occurred was measured by periodically visually inspecting for the presence/absence of crack generation. A longer time here is indicative of a better alkali resistance.

(e) Evaluation of Surface Appearance:

A length 100 mm×width 100 mm×thickness 3 mm flat plate was molded using an "NEX80-9E" injection molder from Nissei Plastic Industrial Co., Ltd., a cylinder temperature of 250° C., and a mold temperature of 80° C., and the surface appearance was evaluated by visual classification as follows.

A: good
B: somewhat poor
C: very poor

Overall Evaluation

Based on the results in the preceding, an overall evaluation was rendered using the following three items and a three level scale, i.e., a 1 when all were satisfied, a 2 when two were satisfied, and a 3 when one or fewer was satisfied.

1) the heat shock resistance is at least 300 cycles
2) the alkali resistance is at least 300 hours
3) the surface appearance is good, i.e., A The results of the evaluations are given in Table 2 below.

TABLE 2

| component | designation | example 1 | example 2 | example 3 | example 4 | comparative example 1 | comparative example 2 | comparative example 3 |
|---|---|---|---|---|---|---|---|---|
| (A) thermoplastic resin | A1-1 | 50 | 50 | 50 | 50 | 50 | 50 | 50 |
|  | A1-2 | 50 | 50 | 50 | 50 | 50 | 50 | 50 |
| (B) elastomer | B1 | 18 | 18 | 18 | 18 | 18 | 18 | 18 |
| (C) epoxy compound | C1 | 1.8 |  |  | 0.9 |  |  |  |
|  | C2 |  | 0.9 | 1.8 | 0.9 | 0.9 | 0.9 | 0.9 |
| (D) reinforcing filler | D | 55 | 55 | 55 | 55 | 55 | 55 | 55 |
| (E) silicone compound | E1 | 5.1 | 5.1 | 5.1 | 5.1 |  |  |  |
|  | E2 |  |  |  |  |  | 1.3 |  |
|  | E3 |  |  |  |  |  |  | 2.5 |
| (F) mold-release agent | F | 0.9 | 0.9 | 0.9 | 0.9 | 0.9 | 0.9 | 0.9 |
| (G) stabilizer | G | 0.6 | 0.6 | 0.6 | 0.6 | 0.6 | 0.6 | 0.6 |
| Charpy impact strength (kJ/m$^2$) |  | 12 | 12 | 12 | 12 | 12 | 12 | 12 |
| hydrolysis resistance tensile strength retention ratio @100 hr (%) |  | 72 | 85 | 89 | 91 | 74 | 75 | 65 |
| heat shock resistance (cycles) |  | 300 | 460 | 460 | 460 | 260 | 160 | 80 |
| alkali resistance (hours) |  | ≥500 | ≥500 | ≥500 | ≥500 | 250 | ≥500 | 18 |
| surface appearance |  | B | A | A | A | A | C | A |
| overall evaluation |  | 2 | 1 | 1 | 1 | 3 | 3 | 3 |

The results in the preceding Table 2 demonstrate that the polybutylene terephthalate resin compositions according to Examples 1 to 4 achieve a good balance among all of the impact resistance, hydrolysis resistance, heat shock resistance, alkali resistance, and surface appearance.

Examples 21 to 24 and Comparative Example 21

<Production of Polybutylene Terephthalate Resin Compositions>

The components described in Table 1, other than the glass fiber, were blended in the proportions (parts by mass in all instances) given in Table 3 below and were melt-kneaded using a vented 30-mm twin-screw extruder (TEX30α twin-screw extruder, from The Japan Steel Works, Ltd.) at a barrel temperature of 270° C. with the glass fiber being fed from a side feeder. After extrusion in strand form, pelletization was carried out using a strand cutter to obtain pellets of the polybutylene terephthalate resin composition.

Measurement and Evaluation Methods

Measurement and evaluation were carried out proceeding as above, while the laser weld strength was measured using the following method.

(e) Laser Weld Strength (unit: N)

Figure 4:
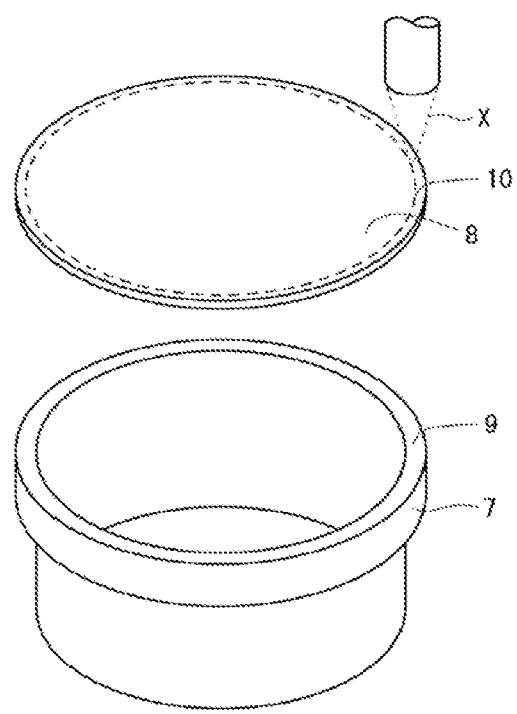
FIG. 4 is a perspective diagram of a laser-welded article used for measurement of the laser weld strength in the examples and comparative examples.

To measure the laser weld strength, a cylindrical absorption side member 7 and a disk-shaped transmission side member 8, as shown in FIG. 4, were fabricated; these were stacked on each other and laser welding was performed to obtain a laser-welded article; and the weld strength of this was measured.

(1) Fabrication of the Absorption Side Member Test Piece

The aforementioned pellets obtained in accordance with the examples and comparative examples were dried for 7 hours at 120° C., after which a cylindrical absorption side member test piece as shown by the absorption side member 7 in FIG. 4 (48 mm diameter, 20 mm height, having a protrusion with a height of 2 mm and a width of 2 mm versus a total width for the joint surface 9 of 5 mm) was injection molded using an injection molder ("J55" from The Japan Steel Works, Ltd.) and conditions of a cylinder temperature of 260° C., a mold temperature of 80° C., an injection rate of 60 mm/s, a holding pressure of 70 MPa, a holding time of 5 s, and a cooling time of 15 s. The shape of the molded article was designed so the gate position was in the center of the bottom surface of the cylindrical shape, a pin gate with a gate diameter Φ of 1.2 mm was used, and the weld surface 9 was in the vicinity of the end of resin flow.

(2) Fabrication of the Transmission Side Member Test Piece 100 parts by mass of polybutylene terephthalate resin (the aforementioned "NOVADURAN 5008"), 1.5 parts by mass of a cresol novolac epoxy compound (the aforementioned "YDCN704"), 0.3 parts by mass of a stabilizer (product name: AO-60, ADEKA Corporation), 0.7 parts by mass of a mold-release agent (product name: Unister H476D, NOF Corporation), 1.8 parts by mass of a dye as colorant (product name: SLT-2-0009, Orient Chemical Industries Co., Ltd.), and 44 parts by mass of a reinforcing filler (the aforementioned "T-127") were mixed, and transmission side member pellets were produced proceeding by the same production method as described above. Using the obtained transmission side member pellets and the same molding conditions as in (e-1), a disk-shaped (diameter 48 mm, thickness 1.5 mm) transmission side member test piece, as shown by the transmission side member 8 in FIG. 4, was injection molded.

(3) Laser Welding

The absorption side member test piece and the transmission side member test piece were stacked on each other using a pressing force per unit area of 2.5 N/mm², and laser welding was performed using a galvanoscanning laser device (laser wavelength: 1070 nm, laser spot diameter Φ of 2.0 mm, from Fine Device Co., Ltd.) and conditions of an output of 180 W and a rate of 900 mm/s, by scanning the intended welded line 10 with the laser light×(15 laps).

(4) Measurement of the Joining Strength (unit: N)

The laser weld strength of the welded article provided by welding was measured. The joining strength of the welded article was measured using a tensile tester ("1 t Tensilon" from Orientec Co., Ltd.), and the evaluation was performed by attaching the tensile rod to the test tool that had been inserted in the interior of the welded article prior to welding and by pulling at 5 mm/min from the side of the transmission side member 8.

Overall Evaluation

Based on the results in the preceding, an overall evaluation was rendered using the following three items and a three level scale, i.e., a 1 when all were satisfied, a 2 when two were satisfied, and a 3 when one or fewer was satisfied.
1) the alkali resistance is at least 300 hours
2) the surface appearance is good, i.e., A
3) the laser weld strength is at least 1,500 N
The results are given in Table 3 below.

TABLE 3

|  |  | example | | | | comparative example |
|---|---|---|---|---|---|---|
| component | designation | 11 | 12 | 13 | 14 | 11 |
| (A) thermoplastic resin | A1-1 | 100 | 100 | 100 | 100 | 100 |
| (B) elastomer | B1 |  |  | 2 | 19 |  |
| (C) epoxy compound | C1 |  | 0.9 |  |  |  |
|  | C2 | 0.8 |  | 0.8 | 0.8 | 0.8 |
| (D) reinforcing filler | D | 46 | 47 | 48 | 55 | 46 |
| (E) silicone compound | E1 | 2.1 | 4.3 | 4.5 | 5.2 |  |
|  | E3 |  |  |  |  | 2.2 |
| (F) mold-release agent | F | 0.8 | 0.8 | 0.8 | 0.9 | 0.8 |
| (G) stabilizer | G | 0.5 | 0.5 | 0.5 | 0.6 | 0.5 |
| (H) carbon black | H | 0.2 | 0.2 | 0.2 | 0.2 | 0.2 |
| Charpy impact strength (kJ/m²) |  | 10 | 10 | 11 | 12 | 10 |

TABLE 3-continued

|  |  | example |  |  |  | comparative example |
|---|---|---|---|---|---|---|
| component | designation | 11 | 12 | 13 | 14 | 11 |
| hydrolysis resistance tensile strength retention ratio @100 hr (%) | | 79 | 67 | 86 | 84 | 75 |
| alkali resistance (hours) | | 250 | 300 | ≥500 | ≥500 | 80 |
| laser weld strength (N) 180 W, 900 mm/s, 15 laps | | 2102 | 1888 | 1920 | 986 | 2583 |
| surface appearance | | A | A | A | A | C |
| overall evaluation | | 2 | 1 | 1 | 2 | 3 |

The results in the preceding Table 3 demonstrate that the polybutylene terephthalate resin compositions according to Examples 11 to 14 achieve a good balance among all of the impact resistance, hydrolysis resistance, alkali resistance, surface appearance, and laser weldability.

Examples 21 to 23 and Comparative Examples 21 and 22

<Production of Polybutylene Terephthalate Resin Compositions>

The components described in Table 1, other than the glass fiber, were blended in the proportions (parts by mass in all instances) given in Table 4 below and were melt-kneaded using a vented 30-mm twin-screw extruder (TEX30α twin-screw extruder, from The Japan Steel Works, Ltd.) at a barrel temperature of 270° C. with the glass fiber being fed from a side feeder. After extrusion in strand form, pelletization was carried out using a strand cutter to obtain pellets of the polybutylene terephthalate resin composition.

Measurement and Evaluation Methods

Measurement and evaluation were carried out proceeding as above, while the joining strength was measured using the following method.

(f) Joining Strength (Unit: N)

Production of two-color molding test piece for measuring the joining strength:

An ISO-1A abutting type two-color molding test piece was molded using an injection molder from The Japan Steel Works, Ltd., i.e., a "J180AD-2M (mold clamping force 180 t, screw diameter cylinder A=46 mm, B=40 mm)". The mold temperature was 80° C.; "Iupilon S-3000R" polycarbonate resin from Mitsubishi Engineering-Plastics Corporation was molded as the primary material at a cylinder temperature of 300° C.; and the pellets obtained in the particular example or comparative example were molded as the secondary material at a cylinder temperature of 260° C.

Measurement of the Joining Strength:

A tensile test was performed on the resulting two-color molding test piece at a room temperature of 23° C., a speed of 5 mm/min, and a chuck distance of 115 mm to determine the joining strength at failure (unit: N).

Overall Evaluation

Based on the results in the preceding, an overall evaluation was rendered using the following three items and a three level scale, i.e., a 1 when all were satisfied, a 2 when two were satisfied, and a 3 when one or fewer was satisfied.

1) the alkali resistance is at least 300 hours
2) the surface appearance is good, i.e., A
3) the joining strength is at least 1,000 N The results are given in Table 4 below.

TABLE 4

|  |  | example |  |  | comparative example |  |
|---|---|---|---|---|---|---|
| component | designation | 21 | 22 | 23 | 21 | 22 |
| (A) thermoplastic resin | A1-1 | 85 | 60 | 60 | 100 | 60 |
|  | A2 | 15 | 40 | 40 |  | 40 |
| (B) elastomer | B1 |  |  | 18 | 18 |  |
|  | B2 | 18 | 18 |  |  | 18 |
| (C) epoxy compound | C1 | 1.8 | 1.8 | 1.8 |  | 1.8 |
|  | C2 |  |  |  | 0.9 |  |
| (D) reinforcing filler | D | 55 | 55 | 55 | 55 | 55 |
| (E) silicone compound | E1 | 5.1 | 5.1 | 5.1 |  |  |
|  | E3 |  |  |  |  | 2.5 |
| (F) mold-release agent | F | 0.9 | 0.9 | 0.9 | 0.9 | 0.9 |
| (G) stabilizer | G | 0.6 | 0.6 | 0.6 | 0.6 | 0.6 |
| Charpy impact strength (kJ/m²) | | 12 | 11 | 14 | 12 | 12 |
| hydrolysis resistance tensile strength retention ratio @100 hr (%) | | 67 | 68 | 68 | 65 | 68 |
| alkali resistance (hours) | | ≥500 | ≥500 | ≥500 | 18 | 400 |
| surface appearance | | A | A | A | A | C |
| joining strength (N) | | 1000 | 1200 | 980 | 750 | 950 |
| overall evaluation | | 1 | 1 | 2 | 3 | 3 |

The results in the preceding Table 4 demonstrate that the polybutylene terephthalate resin compositions according to Examples 21 to 23 achieve a good balance among all of the impact resistance, hydrolysis resistance, alkali resistance, surface appearance, and two-color moldability.

INDUSTRIAL APPLICABILITY

The polybutylene terephthalate resin composition according to the present invention can achieve a very high degree of alkali resistance and heat shock resistance and also exhibits an excellent impact resistance, and is therefore a material very useful in the automotive sector and particularly for the production of automotive electrical parts, sensor parts, and engine-adjacent and undercarriage automotive parts. It is useful in a broad range of sectors for, e.g., electrical and electronic parts, building material parts, and machinery parts.

The laser-weldable polybutylene terephthalate resin composition according to the present invention can achieve a good balance among all of the following: impact resistance, hydrolysis resistance, alkali resistance, surface appearance, and laser weldability. It is therefore useful in a broad range of sectors for, e.g., electrical and electronic parts, building material parts, and machinery parts, and is a material very useful in the automotive sector and particularly for the production of automotive electrical parts, sensor parts, and engine-adjacent and undercarriage automotive parts.

The polybutylene terephthalate resin composition according to the present invention can achieve a good balance among all of the following: impact resistance, hydrolysis resistance, alkali resistance, surface appearance, and two-color moldability. It is therefore a material very useful in the automotive sector and particularly for the production of automotive electrical parts, sensor parts, and engine-adjacent and undercarriage automotive parts. It is also useful in a broad range of sectors, e.g., electrical and electronic parts, building material parts, machinery parts, and so forth.

REFERENCE SIGNS LIST

1 Insert iron piece
2 Support pin
3 Insert iron piece inserted in a mold
4 Cavity
5 Support pin outline
6 Weld line
7 Absorption side member
8 Transmission side member

The invention claimed is:

1. A polybutylene terephthalate resin composition, comprising:
a thermoplastic resin (A) comprising from 60 to 100 parts of a polybutylene terephthalate resin per 100 parts of the thermoplastic resin (A); and,
per 100 parts by mass of the thermoplastic resin (A),
from 5 to 30 parts by mass of an ethylene-butyl acrylate copolymer as an elastomer (B),
from 0.3 to 4 parts by mass of an epoxy compound (C),
from 15 to 80 parts by mass of a reinforcing filler (D), and
from 1 to 15 parts by mass of a masterbatch (E) comprising a silicone oil with a weight-average molecular weight of 10,000 to 80,000 and a thermoplastic resin,
wherein
a butyl acrylate content of the elastomer (B) is at least 10 mass %,
the thermoplastic resin of the masterbatch is incompatible with the polybutylene terephthalate resin and is at least one selected from the group consisting of a polyolefin resin, a polyamide resin, a styrene resin, a polyphenylene ether resin, and a polyphenylene sulfide resin,
an amount of terminal carboxyl end group in the polybutylene terephthalate resin is not more than 30 eq/ton, and
an equivalent weight ratio (epoxy group/COOH group) for the epoxy group in the epoxy compound (C) to the terminal COOH group in the polybutylene terephthalate resin is from 0.3 to 2.5.

2. The polybutylene terephthalate resin composition of claim 1, wherein the epoxy compound (C) is a novolac epoxy compound.

3. The polybutylene terephthalate resin composition of claim 1, wherein the thermoplastic resin (A) further comprises a polycarbonate resin.

4. A laser-weldable polybutylene terephthalate resin composition, comprising the resin composition of claim 1.

5. A laser-weldable molded article formed by molding the laser-weldable polybutylene terephthalate resin composition of claim 4.

6. A laser-welded article provided by laser welding a transmission side member with an absorption side member, wherein at least one of the transmission side member and the absorption side member is the laser-weldable molded article of claim 5.

7. A laser-welded article having the laser-weldable molded article of claim 5 as an absorption side member.

8. A two-color molded article, comprising:
a member (I) formed by molding the resin composition of claim 1 and
a member (II) formed by molding a resin composition different from the resin composition forming the member (I).

* * * * *